(12) United States Patent
Waxman (10) Patent No.: US 7,706,457 B2
(45) Date of Patent: Apr. 27, 2010

(54) SYSTEM AND METHOD FOR BEAMFORMING USING RATE-DEPENDENT FEEDBACK IN A WIRELESS NETWORK

(75) Inventor: Shay Waxman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 833 days.

(21) Appl. No.: 11/396,387

(22) Filed: Mar. 31, 2006

(65) Prior Publication Data

US 2007/0230595 A1 Oct. 4, 2007

(51) Int. Cl.
- H04K 1/10 (2006.01)
- H04B 3/46 (2006.01)
- H04B 7/10 (2006.01)
- H04B 1/10 (2006.01)
- H04L 27/00 (2006.01)

(52) U.S. Cl. .................. 375/260; 375/225; 375/295; 375/316; 375/347; 375/349

(58) Field of Classification Search ............... 375/260, 375/225, 295, 316, 347, 349
See application file for complete search history.

(56) References Cited

U.S. PATENT DOCUMENTS

| | | | | | |
|---|---|---|---|---|---|
| 4,972,357 | A | * | 11/1990 | Morel | 708/313 |
| 5,117,238 | A | * | 5/1992 | Silverstein et al. | 342/373 |
| 6,134,273 | A | * | 10/2000 | Wu et al. | 375/261 |
| 6,452,981 | B1 | * | 9/2002 | Raleigh et al. | 375/299 |
| 7,333,555 | B2 | | 2/2008 | Basson et al. | |
| 2003/0069717 | A1 | * | 4/2003 | Havelock | 702/191 |
| 2004/0028003 | A1 | * | 2/2004 | Diener et al. | 370/319 |
| 2004/0086027 | A1 | * | 5/2004 | Shattil | 375/146 |
| 2005/0036465 | A1 | | 2/2005 | Waxman et al. | |
| 2005/0135459 | A1 | | 6/2005 | Ginzburg et al. | |
| 2005/0271133 | A1 | | 12/2005 | Waxman | |
| 2006/0120469 | A1 | * | 6/2006 | Maltsev et al. | 375/260 |
| 2006/0146705 | A1 | | 7/2006 | Waxman | |
| 2006/0150064 | A1 | | 7/2006 | Waxman | |
| 2006/0159035 | A1 | | 7/2006 | Waxman | |
| 2006/0182017 | A1 | * | 8/2006 | Hansen et al. | 370/208 |
| 2006/0215627 | A1 | | 9/2006 | Waxman | |
| 2006/0221911 | A1 | | 10/2006 | Waxman | |
| 2006/0221914 | A1 | | 10/2006 | Waxman | |
| 2006/0270415 | A1 | | 11/2006 | Waxman | |
| 2007/0002892 | A1 | | 1/2007 | Waxman | |
| 2007/0111666 | A1 | | 5/2007 | Waxman | |
| 2007/0153725 | A1 | | 7/2007 | Waxman | |
| 2007/0153749 | A1 | | 7/2007 | Waxman | |
| 2007/0171887 | A1 | | 7/2007 | Waxman | |
| 2009/0024035 | A1 | * | 1/2009 | Lazenby | 600/443 |

* cited by examiner

*Primary Examiner*—Mohammad H Ghayour
*Assistant Examiner*—Sarah Hassan
(74) *Attorney, Agent, or Firm*—Schwegman, Lundberg & Woessner, P.A.; Gregory J. Gorrie (57) ABSTRACT

Embodiments of multicarrier receiver and method for beamforming using rate-dependent feedback in a wireless network are generally described herein. Other embodiments may be described and claimed. In some embodiments, decimated beamforming matrices are generated for groups of two or more subcarriers and provided to a multicarrier transmitter. The number of subcarriers in a group may be based on a receive data rate. The multicarrier transmitter uses the decimated beamforming matrices to beamform signals for transmission to the multicarrier receiver.

20 Claims, 4 Drawing Sheets

FIG. 1
MULTICARRIER TRANSMITTER

FIG. 2
MULTICARRIER RECEIVER

SYSTEM AND METHOD FOR BEAMFORMING USING RATE-DEPENDENT FEEDBACK IN A WIRELESS NETWORK

TECHNICAL FIELD

Some embodiments of the present invention pertain to wireless communication systems. Some embodiments of the present invention pertain to wireless communication systems that communicate beamformed signals using multiple antennas.

BACKGROUND

Beamforming is used in many conventional wireless communication systems to help improve the signal-to-noise ratio of received signals and increase system throughput. Some types of beamforming use feedback from a receiver to compensate for the effects of the channel. The feedback required for these beamforming techniques may consume channel bandwidth which in turn, may reduce system throughput. This feedback also consumes energy.

Thus, there are general needs for systems and methods for beamforming that consume less channel bandwidth and reduce energy consumption. There are also general needs for systems and methods for beamforming that consume less channel bandwidth and reduce energy consumption while maintaining acceptable throughput levels.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
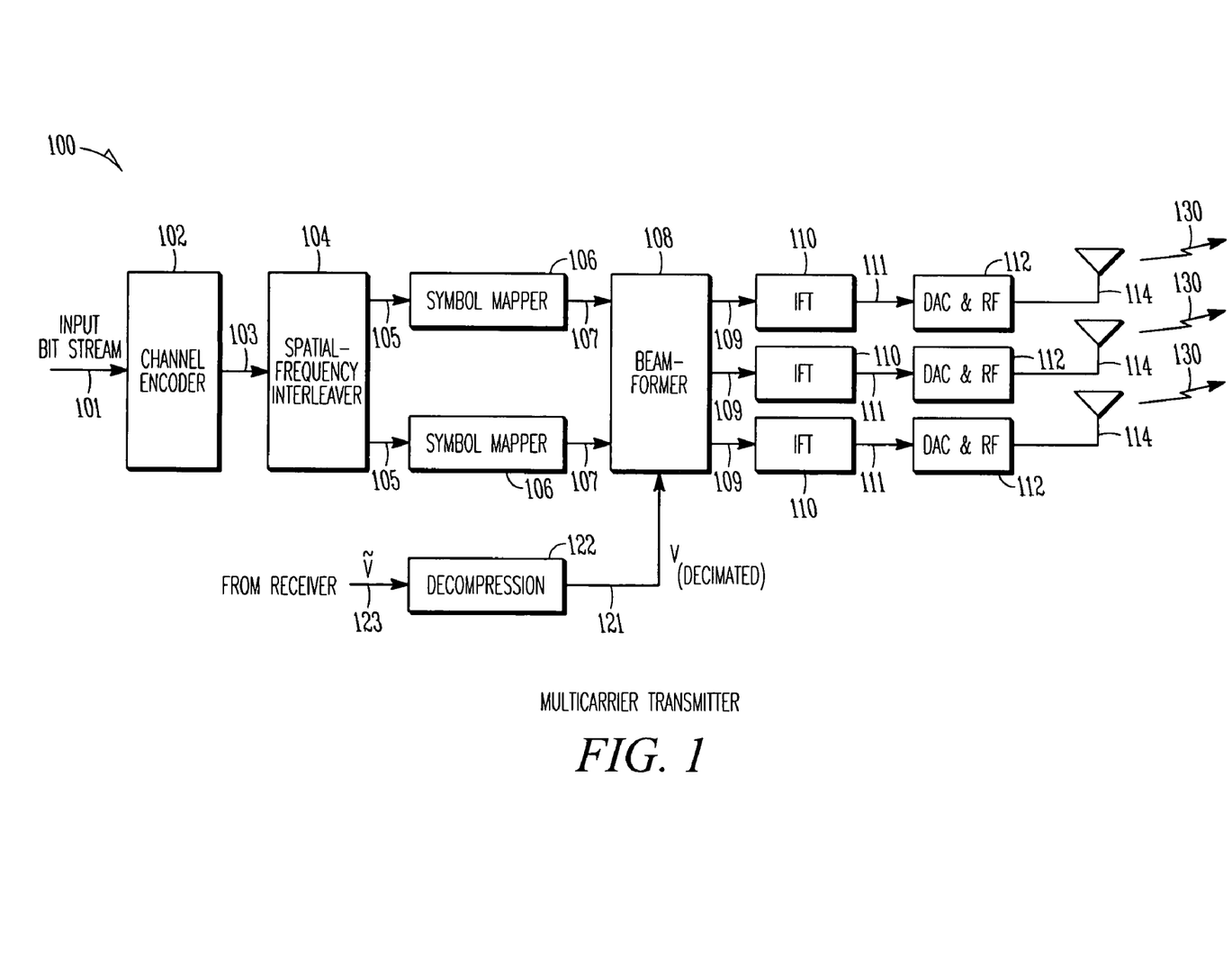
FIG. 1 is a block diagram of a multicarrier transmitter in accordance with some embodiments of the present invention.

FIG. 1 is a block diagram of a multicarrier transmitter in accordance with some embodiments of the present invention. Multicarrier transmitter 100 generates multicarrier communication signals 130 from input bit stream 101 using two or more of transmit antennas 114. In some embodiments, multicarrier transmitter 100 may be part of a multiple-input multiple-output (MIMO) multicarrier communication system in which two or more of transmit antennas 114 are used to convey data streams to a multicarrier receiving station having two or more receive antennas, although the scope of the invention is not limited in this respect.

In accordance with some embodiments of the present invention, multicarrier communication signals 130 are generated by applying decimated beamforming matrices (V) 121 to two or more subcarriers of symbol-modulated subcarriers 107. Each of decimated beamforming matrices (V) 121 may be generated from channel estimates that may be generated by a receiver (e.g., receiver 200 shown in FIG. 2). The number of subcarriers that each decimated beamforming matrix 121 is applied to may depend on a receive data rate. These embodiments are described in more detail below.

Multicarrier transmitter 100 may comprise channel encoder 102 to encode input bit stream 101 and spatial-frequency interleaver 104 to generate one or more spatial streams 105 from encoded bit stream 103. In some embodiments, channel encoder 102 may be a channel encoder which may add error-checking to the bit stream. In some embodiments, spatial-frequency interleaver 104 may generate one or more spatial streams 105 which may be transmitted to a multicarrier receiving station with two or more receive antennas. In some embodiments, spatial-frequency interleaver 104 may generate one or more spatial streams 105 by selecting bits of encoded bit stream 103 in some predetermined fashion.

Multicarrier transmitter 100 may also comprise one or more symbol mappers 106 associated with each of spatial streams 105 to map bits of spatial streams 105 to symbols to generate symbol streams. In some embodiments, symbol mappers 106 may also map bits of spatial streams 105 to subcarriers associated with a multicarrier communication channel to generate symbol-modulated subcarriers 107 for each of spatial streams 105. In some of these embodiments in which a multicarrier communication signal uses fifty-two subcarriers, each symbol mapper 106 may generate fifty-two corresponding symbol-modulated subcarriers in the frequency domain. These may be referred to as frequency-domain symbol-modulated subcarriers 107. In some embodiments, symbol mappers 106 may comprise quadrature-amplitude-modulation (QAM) mappers, although the scope of the invention is not limited in this respect.

In some embodiments, symbol mappers 106 may map bits in accordance with a modulation assignment that may range from zero bits per symbol to up to ten or more bits per symbol. In some embodiments, the subcarrier modulation level may comprise one or more of binary phase shift keying (BPSK), which communicates one bit per symbol, quadrature phase shift keying (QPSK), which communicates two bits per symbol, 8PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Modulation levels with even higher data communication rates per subcarrier may also be used.

Multicarrier transmitter 100 may also comprise beamformer 108 to apply decimated beamforming matrices 121 to frequency-domain symbol-modulated subcarriers 107 of each spatial stream 105 and generate beamformed symbol-modulated subcarriers 109 for subsequent transmission by a corresponding one of transmit antennas 114. In some embodiments, beamformer 108 may apply decimated beamforming matrices 121 as weights to weight symbol-modulated subcarriers 107. These embodiments are described in more detail below.

In some embodiments, beamformed symbol-modulated subcarriers 109 may be associated with a particular antenna and antenna stream. In some embodiments, the number of antenna streams may be greater than or equal to the number of spatial streams 105, although the scope of the invention is not limited in this respect. In some embodiments, the number of antenna streams may correspond to the number of transmit antennas 114. Although multicarrier transmitter 100 is illustrated with three antenna streams (e.g., each associated with one of transmit antennas 114) and two spatial streams 105, the scope of the invention is not limited in these respects.

Multicarrier transmitter 100 may also comprise inverse Fourier transform (IFT) circuitry 110 for each antenna stream to perform an inverse Fourier transformation on beamformed symbol-modulated subcarriers 109 to generate time-domain samples 111. In some embodiments, IFT circuitry 110 may add a guard interval (GI) including a cyclic prefix (CP), although the scope of the invention is not limited in this respect.

Multicarrier transmitter 100 may also comprise digital-to-analog conversion (DAC) and radio-frequency (RF) circuitry 112 associated with each antenna stream to respectively digitize and convert time-domain samples 111 to RF multicarrier time-domain signals for subsequent transmission by a corresponding one of transmit antennas 114.

In some embodiments, decimated beamforming matrices may be received from a multicarrier receiver in compressed form. In these embodiments, multicarrier transmitter 100 may also comprise decompression unit 122 to decompress compressed decimated beamforming matrices (V) 123 to provide decimated beamforming matrices 121 to beamformer 108. Decompression unit 122 may operate when a multicarrier receiver transmits compressed decimated beamforming matrices 123 as feedback to multicarrier transmitter 100.

In some embodiments in which the multicarrier communication signals comprise a plurality of substantially orthogonal subcarriers, each of decimated beamforming matrices 121 may be applied by beamformer 108 to two or more subcarriers depending on the decimation factor. In some embodiments, beamformer 108 may interpolate decimated beamforming matrices 121 to generate a separate beamforming matrix to apply to each subcarrier. These embodiments are discussed in more detail below.

In some MIMO embodiments, beamformer 108 may comprise a plurality of individual subcarrier beamformers which may be associated with each subcarrier. Each subcarrier beamformer may apply the elements of one of decimated beamformer matrices 121 to frequency-domain symbol-modulated subcarriers 107 to generate beamformed symbol-modulated subcarriers 109 for each transmit antenna 114. In these embodiments, beamformed symbol-modulated subcarriers 109 may be associated with a number of transmit antennas 114 which may be greater than or equal to a number of spatial streams 105, although the scope of the invention is not limited in this respect.

Figure 2:
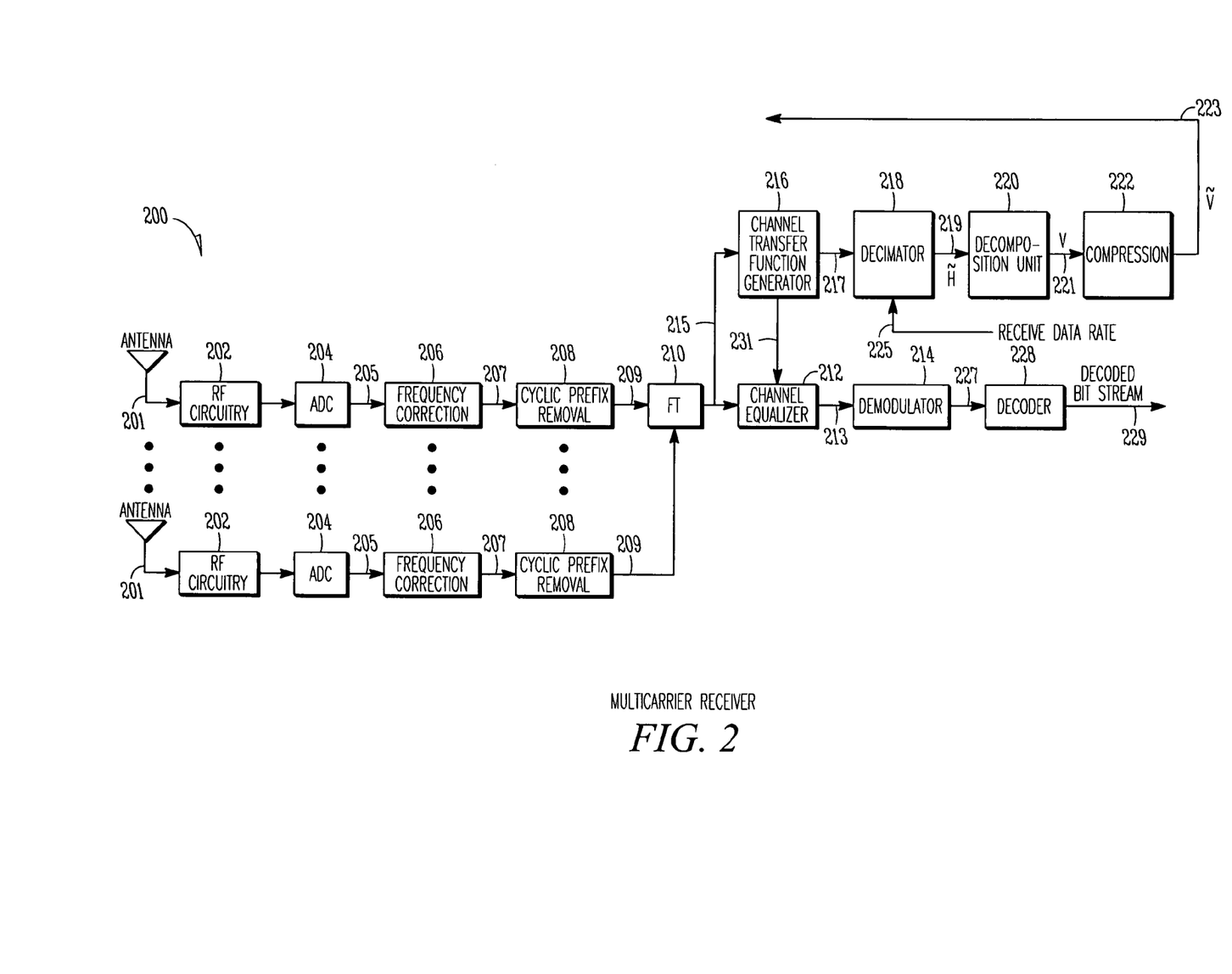
FIG. 2 is a block diagram of a multicarrier receiver in accordance with some embodiments of the present invention.

FIG. 2 is a block diagram of a multicarrier receiver in accordance with some embodiments of the present invention. Multicarrier receiver 200 may communicate multicarrier signals with a multicarrier transmitter, such as multicarrier transmitter 100 (FIG. 1). Receiver 200 receives radio-frequency (RF) signals through one or more of antennas 201, processes the received signals, and generates decoded bit stream 229. Receiver 200 is illustrated in FIG. 2 as a multicarrier receiver which may receive and process multicarrier signals, such as orthogonal frequency division multiplexed (OFDM) signals and orthogonal frequency division multiple access (OFDMA) signals, however the scope of the invention is not limited in this respect.

Receiver 200 may include radio-frequency (RF) circuitry 202 to down-convert the received signals and analog-to-digital conversion (ADC) circuitry 204 to digitize the received signals and generate digital time-domain signals 205. Receiver 200 may also include frequency correction circuitry 206 to correct any frequency offset present in the received signals. In some embodiments, receiver 200 may also include cyclic prefix removal circuitry 208 to remove a cyclic prefix from frequency-corrected time-domain signals 207. Receiver 200 may also include Fourier-transform (FT) circuitry 210 to perform a Fourier transform on digital time-domain signals 209 to generate frequency-domain signals 215. In some embodiments, Fourier-transform circuitry 210 may provide a frequency-domain signal for each subcarrier of a received multicarrier communication signal. In some embodiments, Fourier-transform circuitry 210 may perform a discrete Fourier transform (DFT), such as a fast Fourier transform (FFT), although the scope of the invention is not limited in this respect.

Receiver 200 may also include channel transfer function generator 216 to generate channel estimates 231 for each data subcarrier based on received frequency-domain signals 215. In some embodiments, channel estimates 231 may comprise weights for each data subcarrier. Receiver 200 may also include channel equalizer 212 to weight the subcarriers of received frequency-domain signals 215 based on channel estimates 231 to generate channel-equalized frequency-domain signals 213. In accordance with some embodiments, the application of the weights by channel equalizer 212 may help compensate for the effects of the communication channel through which the received signals may have propagated. In some embodiments, channel equalizer 212 may substantially cancel the effects of the communication channel. In some embodiments, channel-equalized frequency-domain signals 213 may comprise a symbol, such as a quadrature-amplitude modulated (QAM) symbol, for each data subcarrier, although the scope of the invention is not limited in this respect.

Receiver 200 may also include demodulator 214 to demodulate channel-equalized frequency-domain signals 213 and generate bit-metrics 227 for each data subcarrier. In some embodiments, symbol demodulator 214 may be a quadrature-amplitude modulation demodulator and the symbols may comprise QAM symbols. Receiver 200 may also include decoder 228 to perform an error-correction decoding operation on bit metrics 227 to generate decoded bit stream 229. In these embodiments, bit metrics 227 may represent probabilities (e.g., soft bits rather than actual hard bits), which may be decoded using soft-decision decoding.

In some embodiments, decoder 228 may be a forward-error-correcting (FEC) decoder. In some embodiments, decoder 228 may be a low-density parity check (LPDC) decoder that performs layered decoding, although the scope of the invention is not limited in this respect. In some embodiments, decoder 228 may perform LDPC layered decoding operations based on a parity-check matrix for a predetermined LDPC code, although the scope of the invention is not limited in this respect.

In some embodiments, receiver 200 may also perform a deinterleaving operation prior to the operation of decoder 228. In some of these embodiments, the deinterleaving operation may be a block deinterleaving operation on blocks of hard bits or on blocks of bit metrics 227, although the scope of the invention is not limited in this respect.

In accordance with embodiments of the present invention, channel transfer function generator 216 may generate channel transfer function matrices (H) 217 from received frequency-domain signals 215. In some embodiments, channel transfer function generator 216 may generate one channel transfer function matrix for each subcarrier of received frequency-domain signals 215. In some embodiments, channel transfer function matrices 217 may be generated from channel estimates which may be estimated from preamble symbols and/or pilot subcarriers of received multicarrier communication signals.

Multicarrier receiver 200 may also comprise decimator 218 to decimate channel transfer function matrices 217 to generate decimated channel transfer function matrices (H) 219 based on receive data rate 225. Receive data rate 225 may be provided by multicarrier transmitter 100 (FIG. 1). Decimator 218 may generate one of decimated channel transfer function matrices 219 for groups of two or more subcarriers. In some embodiments, decimator 218 may combine and/or average groups of channel transfer function matrices 217 to generate each decimated channel transfer function matrix 219.

Multicarrier receiver 200 may also comprise decomposition unit 220 which may perform a decomposition on decimated channel transfer function matrices 219 to generate decimated beamforming matrices (V) 221. Decimated beamforming matrices 221 may be provided to multicarrier transmitter 100 (FIG. 1) as feedback for use in beamforming and may correspond to decimated beamforming matrices 121 (FIG. 1).

Although decimator 218 is illustrated as coming before decomposition unit 220 in the processing path, the scope of the invention is not limited in this respect. In other embodiments, decomposition unit 220 may come before decimator 218. In these embodiments, decomposition unit 220 may decompose channel transfer function matrices 217 into beamforming matrices, and decimator 218 may decimate the beamforming matrices to generate decimated beamforming matrices 221.

In some embodiments, decomposition unit 220 may perform a singular value decomposition (SVD) on decimated channel function matrices 219 to generate decimated beamforming matrices 221. In some embodiments, the SVD operations performed by decomposition unit 220 may decompose a wireless channel into three components based on the following equation:

$$\tilde{H} = U * S * V^T.$$

In this equation, $\tilde{H}$ represents one of decimated channel transfer function matrices 219, U and V are unitary matrices, $V^T$ is the transpose of matrix V, and S is a rectangular matrix having real nonzero-valued diagonal elements and zero-valued non-diagonal elements. In this equation, matrix V corresponds to one of decimated beamforming matrices 221. The SVD operation may effectively decompose the wireless channel into three independent channels in which the S matrix may be viewed as a ranking for the three independent channels.

In some embodiments, multicarrier receiver 200 may also comprise compression circuitry 222 to compress decimated beamforming matrices 221 to generate compressed decimated beamforming matrices ($\tilde{V}$) 223 prior to transmission to multicarrier transmitter 100 (FIG. 1). One of many compression techniques may be used by compression circuitry 222. In these embodiments, compressed decimated beamforming matrices 223 may correspond to compressed decimated beamforming matrices 123 (FIG. 1).

In some embodiments, multicarrier receiver 200 generates decimated beamforming matrices 221 for groups of two or more subcarriers. The number of subcarriers in a group may be based on a receive data rate 225. Multicarrier receiver 200 may also receive signals from multicarrier transmitter 100 (FIG. 1) transmitted with multiple antennas at receive data rate 225. Decimated beamforming matrices 221 (FIG. 1) may be individually applied to the subcarriers of the signals prior to transmission.

In some embodiments, the number of subcarriers in a group is lesser for higher receive data rates and greater for lower receive data rates. In other words, less beamforming feedback may be provided to the transmitter for lower receive data rates, and more beamforming feedback may be provided to the transmitter for higher receive data rates. This is because throughput at lower data rates may be less sensitive to beamforming. In this way, bandwidth consumption for feedback may be reduced when it is less needed.

In some embodiments, decimated beamforming matrices 221 may be generated based on a decimation factor. For higher receive data rates, the decimation factor may be decreased to decrease the number of subcarriers in a group. For lower receive data rates, the decimation factor may be increased to increase the number of subcarriers in a group. In some embodiments, the decimation factor may refer to the number of subcarriers in a group that are used to generate each of decimated beamforming matrices 221. In some embodiments, for a maximum receive data rate, the decimation factor may have the value of two meaning that each decimated beamforming matrix is generated from two subcarriers and is used to beamform two subcarriers. In example embodiments that use fifty-two subcarriers, twenty-six decimated beamforming matrices may be provided as feedback. When the decimation factor is four, each decimated beamforming matrix may be generated from four subcarriers and may be used to beamform four subcarriers at the transmitter. In these example embodiments that use fifty-two subcarriers, thirteen decimated beamforming matrices may be provided as feedback when the decimation factor is four. Decimator factors may range from one to up to eight or more.

In some embodiments, a decimation factor of two may result in less than a 0.5 dB reduction in signal-to-noise ratio (SNR) at maximum data rates (e.g., above 100 Mega-bits-per-second (Mbps)). Accordingly, a decimation factor of two may generally be used for some maximum receive data rates without significant performance degradation, although the scope of the invention is not limited in this respect. A decimation factor of eight may result in less than a 0.5 dB reduction in SNR for lower data rates (e.g., below 20 Mbps). In some embodiments, decimator 218 may increase or decrease the decimation factor based on receive data rate 225.

In some embodiments, multicarrier receiver 200 may determine receive data rate 225 from a packet header received from multicarrier transmitter 100 (FIG. 1) prior to generating decimated beamforming matrices 221.

In some embodiments, for higher receive data rates 225, each of decimated beamforming matrices 221 may be used by multicarrier transmitter 100 (FIG. 1) for beamforming a lesser number of subcarriers. For lower receive data rates 225, each of the decimated beamforming matrices 221 may be used by multicarrier transmitter 100 (FIG. 1) for beamforming a greater number of subcarriers.

In some embodiments, each of channel transfer function matrices 217 may have a number of columns corresponding with the number of spatial streams ($N_{ss}$) and may have a number of rows associated with the number of transmit antennas ($N_{tx}$). The use of the terms rows and columns may be interchanged without limiting the scope of the invention. In the case of multicarrier transmitter 100 (FIG. 1), there are two spatial steams (i.e., $N_{ss}$=2) illustrated as being generated by spatial frequency interleaver 104 (FIG. 1) and there are three transmit antennas 114 (FIG. 1) (i.e., $N_{tx}$=3). In these embodiments, each of channel transfer function matrices 217 may be a 3×2 matrix. In the example of a multicarrier communication channel that uses fifty-two total subcarrier frequencies (i.e., the number of subcarriers), there may be fifty-two separate channel transfer function matrices 217 (i.e., one for each active subcarrier), although the scope of the invention is not limited in this respect.

In some beamforming embodiments, multicarrier transmitter 100 (FIG. 1) may implement ideal beamforming. In these embodiments, receiver 200 may provide non-decimated beamforming matrices to multicarrier transmitter 100 (FIG. 1) based on receive data rate 225. In these embodiments, decimator 218 may refrain from decimating channel transfer function matrices 217, allowing decomposition unit 220 to generate a beamforming matrix for each subcarrier for transmission to multicarrier transmitter 100 (FIG. 1). In these embodiments, the decimator factor may equal one.

Referring to FIGS. 1 and 2 together, in some embodiments, multicarrier receiver 200 may receive multicarrier communication signals 130 from multicarrier transmitter 100 through a communication channel having characteristics of channel transfer function matrices 217. These channel transfer function matrices 217 may be used by a channel equalizer to equalize the received signals to generate a received bit stream. In some embodiments, multicarrier receiver 200 may apply non-linear MIMO equalization techniques to separate the spatial streams. In some embodiments, multicarrier transmitter 100 may receive decimated beamforming matrices 121 from multicarrier receiver 200 as part of a closed-loop MIMO feedback process. In some embodiments, when decomposition unit 220 performs an SVD on decimated channel transfer function matrix 219, each of decimated beamforming matrices 221 may be unitary matrix having a number of rows equaling the number of the transmit antennas ($N_{tx}$), and a number of columns equaling the number of the spatial streams ($N_{ss}$).

Although multicarrier transmitter 100 and multicarrier receiver 200 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of multicarrier transmitter 100 and multicarrier receiver 200 may refer to one or more processes operating on one or more processing elements. Some embodiments of the present invention pertain to wireless communication devices that may include the elements of both multicarrier transmitter 100 and multicarrier receiver 200.

In some embodiments, multicarrier transmitter 100 and multicarrier receiver 200 may communicate orthogonal frequency division multiplexed (OFDM) communication signals over a multicarrier communication channel. The multicarrier communication channel may be within a predetermined frequency spectrum and may comprise a plurality of orthogonal subcarriers. In some embodiments, the multicarrier signals may be defined by closely spaced OFDM subcarriers. Each subcarrier may have a null at substantially a center frequency of the other subcarriers and/or each subcarrier may have an integer number of cycles within a symbol period, although the scope of the invention is not limited in this respect. In some embodiments, multicarrier transmitter 100 and multicarrier receiver 200 may communicate in accordance with a multiple access technique, such as orthogonal frequency division multiple access (OFDMA), although the scope of the invention is not limited in this respect. In some embodiments, multicarrier transmitter 100 and multicarrier receiver 200 may communicate using spread-spectrum signals, although the scope of the invention is not limited in this respect.

In some embodiments, multicarrier transmitter 100 and/or multicarrier receiver 200 may be part of a communication station, such as a wireless local area network (WLAN) communication station including a Wireless Fidelity (WiFi) communication station, an access point (AP) or mobile station (MS). In some other embodiments, multicarrier transmitter 100 and/or multicarrier receiver 200 may be part of a broadband wireless access (BWA) network communication station, such as a Worldwide Interoperability for Microwave Access (WiMax) communication station, although the scope of the invention is not limited in this respect as multicarrier transmitter 100 and multicarrier receiver 200 may be part of almost any wireless communication device.

In some embodiments, multicarrier transmitter 100 and/or multicarrier receiver 200 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, the frequency spectrums for the communication signals used by multicarrier transmitter 100 and multicarrier receiver 200 may comprise either a 5 gigahertz (GHz) frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some BWA network embodiments, the frequency spectrum for the communication signals may comprise frequencies between 2 and 11 GHz, although the scope of the invention is not limited in this respect.

In some embodiments, multicarrier transmitter 100 and multicarrier receiver 200 may communicate in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, although the scope of the invention is not limited in this respect as they may also be suitable to transmit and/or receive communications in accordance with other techniques and standards. Some embodiments of the present invention may apply to the proposed Enhanced Wireless Consortium (EWC) specification of the IEEE 802.11 standards. In some broadband wireless access network embodiments, multicarrier transmitter 100 and multicarrier receiver 200 may communicate in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. Some embodiments may relate to the IEEE 802.11e proposed enhancement to the IEEE 802.11 WLAN specification that will include QoS (quality of service) features, including the prioritization of data, voice, and video transmissions.

Transmit antennas 114 used by multicarrier transmitter 100 and antennas 201 used by multicarrier receiver 200 may comprise two or more directional or omnidirectional antennas, including, for example, dipole antennas, monopole antennas, patch antennas, loop antennas, microstrip antennas or other types of antennas suitable for transmission of RF signals. In some MIMO embodiments that use two or more transmit antennas and two or more receive antennas, instead of two or more antennas, a single antenna with multiple apertures may be used. In these embodiments, each aperture may be considered a separate antenna. In some embodiments, each antenna may be effectively separated to take advantage of spatial diversity and the different channel characteristics that may result between each of transmit antennas 114 and each of the antennas of multicarrier receiver 200.

Figure 3:
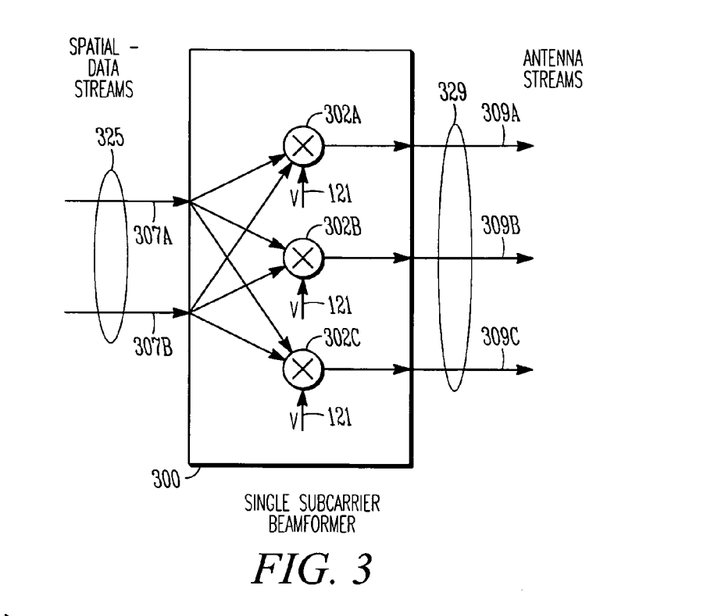
FIG. 3 is a functional diagram of a subcarrier beamformer in accordance with some embodiments of the present invention.

FIG. 3 is a functional diagram of a subcarrier beamformer in accordance with some embodiments of the present invention. Subcarrier beamformer 300 may correspond with one of the subcarrier beamformers that may be part of beamformer 108 (FIG. 1). Subcarrier beamformer 300 may be associated with one of the subcarriers of the multicarrier communication signals. In an example of a multicarrier communication signal having fifty-two total subcarriers, beamformer 108 (FIG. 1) of multicarrier transmitter 100 (FIG. 1) may functionally comprise fifty-two of subcarrier beamformers 300. In some MIMO embodiments, subcarrier beamformer 300 weights frequency-domain symbol-modulated subcarriers 307A and 307B of each spatial stream 325 (for an associated subcarrier frequency) to generate two or more antenna streams 329 of symbol-modulated subcarriers 309A, 309B and 309C. Three antenna streams 329 are illustrated, although the scope of the invention is not limited in this respect.

In some embodiments, subcarrier beamformer 300 may comprise one of weighting elements 302A, 302B and 302C associated with each transmit antenna 114 (FIG. 1). Weighting elements 302A-302C may weight and combine symbol-modulated subcarriers 307A and 307B associated with a corresponding subcarrier by applying elements of one row of decimated beamformer matrix 121 associated with a particular antenna and a corresponding subcarrier to generate symbol-modulated subcarriers 309A, 309B and 309C. For example, weighting element 302A may apply a corresponding first row of elements of decimated beamformer matrix 121 associated with the first antenna of a first antenna stream to combined symbol-modulated subcarriers 307A and 307B associated with a particular subcarrier frequency.

Depending on the decimation factor, each decimated beamformer matrix 121 may be applied to more than one subcarrier. For example, when the decimation factor is two, each of decimated beamformer matrices 121 may be applied to two subcarriers. In some embodiments, when beamformer 108 (FIG. 1) performs an interpolation on decimated beamformer matrices 121 to generate an interpolated beamforming matrix for each subcarrier, one interpolated beamforming matrix may be applied by each subcarrier beamformer 300.

In FIG. 3, symbol-modulated subcarriers 307A and 307B may correspond to symbol-modulated subcarriers 107 (FIG. 1) for two spatial streams. In FIG. 3, symbol-modulated subcarriers 309A, 309B and 309C may correspond to beamformed symbol-modulated subcarriers 109 (FIG. 1) for three antenna streams.

In some embodiments, each of transmit antennas 114 (FIG. 1) may transmit an OFDM symbol using the same subcarrier frequencies as the other transmit antennas. The OFDM symbols may be generated from symbol-modulated subcarriers 309A, 309B or 309C associated with a particular antenna. The OFDM symbols transmitted together by transmit antennas 114 (FIG. 1) may represent one or more of spatial streams 325. In some embodiments, at least two of transmit antennas 114 (FIG. 1) may be used to transmit at least one of spatial streams 325, although the scope of the invention is not limited in this respect.

Figure 4:
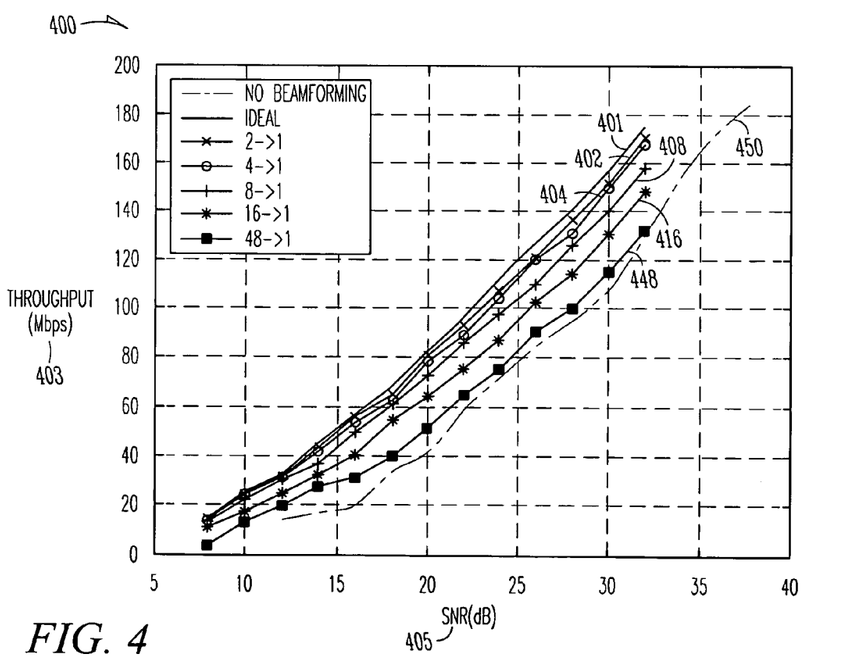
FIG. 4 illustrates throughput performance curves for various decimation factors in accordance with some embodiments of the present invention.

FIG. 4 illustrates throughput performance curves for various decimation factors in accordance with some embodiments of the present invention. Throughput 403 (illustrated in Mbps) is shown on the y-axis of graph 400, and receiver SNR 405 is illustrated on the x-axis of graph 400. SNR curve 401 illustrates SNR performance for a decimation factor of one which was referred to previously as ideal beamforming. SNR curve 402 illustrates SNR performance for a decimation factor of two, SNR curve 404 illustrates SNR performance for a decimation factor of four, SNR curve 408 illustrates SNR performance for a decimation factor of eight, SNR curve 416 illustrates SNR performance for a decimation factor of sixteen, and SNR curve 448 illustrates SNR performance for a decimation factor of forty-eight. SNR curve 450 illustrates SNR performance when no beamforming is applied. In some embodiments, throughput 403 may be referred to good throughput.

Throughput 403 may correspond to receive data rate 225 (FIG. 2) that may be provided by multicarrier transmitter 100 (FIG. 1). As illustrated in FIG. 4, for lower data rates, there is less significance for sending a complete set of beamforming matrices as feedback (i.e., one matrix per subcarrier). For example, a decimation factor of eight may be suitable for lower data rates allowing feedback to be reduced. For lower data rates, feedback packets may, for example, be shortened by a factor of four relative to feedback packet lengths of higher data rates. Shorter feedback packets consume less bandwidth in the feedback path and may provide more time for the transmission of data by multicarrier transmitter 100 (FIG. 1) resulting in a higher throughput. Furthermore, multicarrier receiver 200 (FIG. 2) may consume less energy by transmitting less feedback helping to increase battery life for portable applications.

Figure 5:
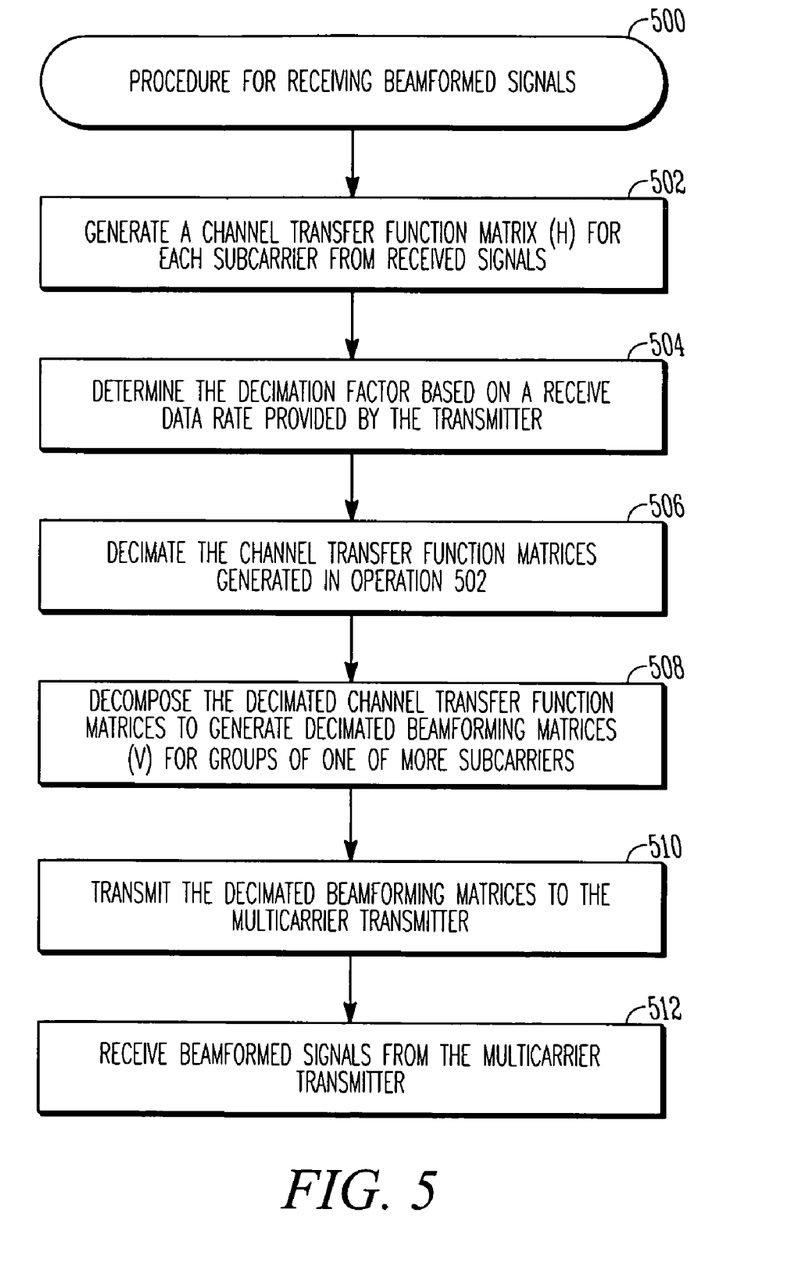
FIG. 5 is a flow chart of a procedure for receiving beamformed signals in accordance with some embodiments of the present invention.

FIG. 5 is a flow chart of a procedure for receiving beamformed signals in accordance with some embodiments of the present invention. Procedure 500 may be performed by a multicarrier receiver, such as multicarrier receiver 200 (FIG. 2), for receiving beamformed transmissions from a multicarrier transmitter, such as multicarrier transmitter 100 (FIG. 1).

Operation 502 comprises generating a channel transfer function matrix (H) for each subcarrier from received signals. Operation 502 may be performed by channel transfer function generator 216 (FIG. 2), although the scope of the invention is not limited in this respect.

Operation 504 comprises determining the decimation factor based on a receive data rate provided by the transmitter. In some embodiments, the receive data rate may be provided in a packet header, although the scope of the invention is not limited in this respect.

Operation 506 comprises decimating the channel transfer function matrices generated in operation 502 based on the decimation factor generated in operation 504. Operation 506 generates decimated channel transfer functions for groups of two or more subcarriers. Operation 506 may be performed by decimator 218 (FIG. 2), although the scope of the invention is not limited in this respect.

Operation 508 comprises decomposing the decimated channel transfer function matrices to generate decimated beamforming matrices (V) for groups of two or more subcarriers. Operation 508 may be performed by decomposition unit 220 (FIG. 2), although the scope of the invention is not limited in this respect.

Operation 510 comprises transmitting the decimated beamforming matrices to the multicarrier transmitter. In some embodiments, prior to transmission, operation 510 may include compressing the decimated beamforming matrices, although the scope of the invention is not limited in this respect.

Operation 512 comprises receiving beamformed signals from the multicarrier transmitter. The receiving beamformed signals may have been transmitted at the receive data rate used in operation 504 to determine the decimation factor.

In some embodiments, operations 502-512 may be repeated on a symbol-by-symbol basis so that updated beamforming coefficients may be used for each transmitted OFDM symbol, although the scope of the invention is not limited in this respect.

Although the individual operations of procedure 500 are illustrated and described as separate operations, one or more of the individual operations may be performed concurrently, and nothing requires that the operations be performed in the order illustrated. For example, operations 502 and 504 may be performed concurrently or in reverse order.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or nonvolatile memory or a combination thereof.

Some embodiments of the invention may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing information in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A method of receiving multicarrier beamformed signals comprising:
   generating decimated beamforming matrices for beamforming groups of two or more subcarriers based on a decimation factor, wherein a number of subcarriers in a beamforming group is based on a receive data rate; and
   receiving signals from a multicarrier transmitter at the receive data rate, the decimated beamforming matrices being applied to the subcarriers of the signals prior to transmission,
   wherein for higher receive data rates the decimation factor is decreased to decrease the number of subcarriers in each beamforming group,
   wherein for lower receive data rates the decimation factor is increased to increase the number of subcarriers in each beamforming group,
   wherein for a communication channel comprising a predetermined number of subcarriers, a greater number of decimated beamforming matrices are generated for higher-receive data rates and a lesser number of decimated beamforming matrices are generated for lower-receive data rates.

2. The method of claim 1
   wherein the decimation factor is the number of subcarriers that are used to generate each of the decimated beamforming matrices.

3. The method of claim 1 wherein for higher receive data rates, each of the decimated beamforming matrices is usable by the multicarrier transmitter for beamforming a lesser number of subcarriers, and
   wherein for lower receive data rates, each of the decimated beamforming matrices is usable by the multicarrier transmitter for beamforming a greater number of subcarriers.

4. The method of claim 1 further comprising:
   determining the receive data rate from a packet header received from the multicarrier transmitter prior to generating the decimated beamforming matrices; and
   transmitting the decimated beamforming matrices to the multicarrier transmitter.

5. The method of claim 4 further comprising compressing the decimated beamforming matrices prior to transmitting the decimated beamforming matrices to the multicarrier transmitter,
   wherein the multicarrier transmitter decompresses the compressed decimated beamforming matrices prior to application to the subcarriers.

6. The method of claim 1 further comprising:
   generating a channel transfer function for each subcarrier from received signals;

decimating the channel transfer functions based on the receive data rate; and performing a decomposition of the decimated channel transfer functions to generate the decimated beamforming matrices for the beamforming groups of subcarriers.

7. The method of claim 6 wherein generating the channel transfer function comprises generating a channel transfer function matrix for each of a plurality of channels between two or more receive antennas and two or more transmit antennas based on signals transmitted by the two or more transmit antennas and received through the two or more receive antennas, and wherein generating the decimated beamforming matrices comprises generating decimated beamforming matrices for each of the channels for beamforming groups of two or more subcarriers based on the receive data rate.

8. A multicarrier receiver comprising:

channel transfer function generation circuitry to generate a channel transfer function for each of a plurality of subcarriers from received signals; and a decimator to generate decimated beamforming matrices for beamforming groups of two or more subcarriers based on a decimation factor, wherein a number of subcarriers in a beamforming group is based on a receive data rate, wherein the received signals are received at the receive data rate and are generated by a multicarrier transmitter by applying the decimated beamforming matrices to the subcarriers of signals prior to transmission, and wherein for higher receive data rates the decimation factor is decreased to decrease the number of subcarriers in each beamforming group, wherein for lower receive data rates the decimation factor is increased to increase the number of subcarriers in each beamforming group, and wherein for a communication channel comprising a predetermined number of subcarriers, a greater number of decimated beamforming matrices are generated for higher-receive data rates and a lesser number of decimated beamforming matrices are generated for lower-receive data rates.

9. The multicarrier receiver of claim 8 wherein the decimation factor is the number of subcarriers that are used to generate each of the decimated beamforming matrices.

10. The multicarrier receiver of claim 8 wherein for higher receive data rates, each of the decimated beamforming matrices is usable by the multicarrier transmitter for beamforming a lesser number of subcarriers, and wherein for lower receive data rates, each of the decimated beamforming matrices is usable by the multicarrier transmitter for beamforming a greater number of subcarriers.

11. The multicarrier receiver of claim 8 further comprising:

circuitry to determine the receive data rate from a packet header received from the multicarrier transmitter prior to the generation of the decimated beamforming matrices; and circuitry to transmit the decimated beamforming matrices to the multicarrier transmitter.

12. The multicarrier receiver of claim 11 further comprising compression circuitry to compress the decimated beamforming matrices prior to transmitting the decimated beamforming matrices to the multicarrier transmitter, wherein the multicarrier transmitter decompresses the compressed decimated beamforming matrices prior to application to the subcarriers.

13. The multicarrier receiver of claim 8 wherein the channel transfer function generation circuitry generates a channel transfer function for each subcarrier from received signals, wherein the decimator decimates the channel transfer functions based on the receive data rate, and wherein the multicarrier receiver further comprises a decomposition unit to perform a decomposition of the decimated channel transfer functions to generate the decimated beamforming matrices for the beamforming groups of subcarriers.

14. The multicarrier receiver of claim 13 wherein the channel transfer function generation circuitry generates a channel transfer function matrix for each of a plurality of channels between two or more receive antennas and two or more transmit antennas based on signals transmitted by the two or more transmit antennas and received through the two or more receive antennas, and wherein the decimator generates the decimated beamforming matrices for each of the channels for beamforming groups of two or more subcarriers based on the receive data rate.

15. A multicarrier transmitter comprising:

a beamformer to apply decimated beamforming matrices to subcarriers of signals prior to transmission; and radio-frequency circuitry to transmit the signals at a receive data rate, the decimated beamforming matrices being received from a multicarrier receiver which generates a channel transfer function for each of a plurality of subcarriers from signals received from the multicarrier transmitter and generates the decimated beamforming matrices for beamforming groups of two or more subcarriers based on a decimation factor, wherein a number of subcarriers in a beamforming group is based on a receive data rate, wherein for higher receive data rates the decimation factor is decreased to decrease the number of subcarriers in each beamforming group, wherein for lower receive data rates the decimation factor is increased to increase the number of subcarriers in each beamforming group, and wherein for a communication channel comprising a predetermined number of subcarriers, a greater number of decimated beamforming matrices are generated for higher-receive data rates and a lesser number of decimated beamforming matrices are generated for lower-receive data rates.

16. The multicarrier transmitter of claim 15 wherein the decimation factor is the number of subcarriers that are used to generate each of the decimated beamforming matrices.

17. A receiver system comprising:

one or more substantially omnidirectional antennas to receive received signals;

channel transfer function generation circuitry to generate a channel transfer function for each of a plurality of subcarriers from the received signals; and a decimator to generate decimated beamforming matrices for beamforming groups of two or more subcarriers based on a decimation factor, wherein a number of subcarriers in a beamforming group is based on a receive data rate, wherein the received signals are received at the receive data rate and are generated by a multicarrier transmitter by applying the decimated beamforming matrices to the subcarriers of signals prior to transmission, wherein for higher receive data rates the decimation factor is decreased to decrease the number of subcarriers in each beamforming group, wherein for lower receive data rates the decimation factor is increased to increase the number of subcarriers in each beamforming group, and wherein for a communication channel comprising a predetermined number of subcarriers, a greater number of decimated beamforming matrices are generated for higher-receive data rates and a lesser number of decimated beamforming matrices are generated for lower-receive data rates.

18. The receiver system of claim 17 wherein the decimation factor is the number of subcarriers that are used to generate each of the decimated beamforming matrices.

19. A computer-readable medium that stores instructions for execution by one or more processors to perform operations comprising:

generating decimated beamforming matrices for beamforming groups of two or more subcarriers based on a decimation factor, wherein a number of subcarriers in a beamforming group is based on a receive data rate; and receiving signals from a multicarrier transmitter at the receive data rate, the decimated beamforming matrices being applied to the subcarriers of the signals prior to transmission, wherein for higher receive data rates the decimation factor is decreased to decrease the number of subcarriers in each beamforming group, wherein for lower receive data rates the decimation factor is increased to increase the number of subcarriers in each beamforming group, and wherein for a communication channel comprising a predetermined number of subcarriers, a greater number of decimated beamforming matrices are generated for higher-receive data rates and a lesser number of decimated beamforming matrices are generated for lower-receive data rates.

20. The computer-readable medium of claim 19 wherein the decimation factor is the number of subcarriers that are used to generate each of the decimated beamforming matrices.

* * * * *